United States Patent
Choo et al.

(10) Patent No.: US 12,294,681 B2
(45) Date of Patent: May 6, 2025

(54) POWER SAVING MODE OF IMAGE FORMING APPARATUS WITH SETTING DETECTION OF WAKEUP EVENTS AND DEACTIVATION OF WAKEUP EVENT DETECTION BASED ON USAGE PATTERN

(71) Applicant: Hewlett-Packard Development Company, L.P., Spring, TX (US)

(72) Inventors: Jounghoon Choo, Seongnam Si (KR); Sunjoo Yoon, Seongnam Si (KR); Jungwoon Jung, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/556,932

(22) PCT Filed: Nov. 2, 2021

(86) PCT No.: PCT/US2021/057683
§ 371 (c)(1),
(2) Date: Oct. 24, 2023

(87) PCT Pub. No.: WO2022/240441
PCT Pub. Date: Nov. 17, 2022

(65) Prior Publication Data
US 2024/0205345 A1 Jun. 20, 2024

(30) Foreign Application Priority Data
May 13, 2021 (KR) .......... 10-2021-0061971

(51) Int. Cl.
*H04N 1/00* (2006.01)
(52) U.S. Cl.
CPC ..... *H04N 1/00896* (2013.01); *H04N 1/00413* (2013.01); *H04N 1/00832* (2013.01); *H04N 1/0097* (2013.01)

(58) Field of Classification Search
CPC .......... H04N 1/00408–00435; H04N 1/00885–00896; H04N 1/00832;
(Continued)

(56) References Cited

U.S. PATENT DOCUMENTS 8,868,953 B2 * 10/2014 Kim .......... H04N 1/00885
713/323
9,036,189 B2 * 5/2015 Yamamoto ......... H04N 1/00891
358/1.14
(Continued)

FOREIGN PATENT DOCUMENTS

CN   105388991 A   3/2016
JP    5488243 B2 * 5/2014
(Continued)

OTHER PUBLICATIONS

European search report and opinion by the EPO for application No. 21942124.5 (Year: 2024).*

*Primary Examiner* — Scott A Rogers
(74) *Attorney, Agent, or Firm* — Brooks, Cameron & Huebsch, PLLC

(57) ABSTRACT

An example image forming device includes a wakeup source to detect an event for cancelling a power saving mode of the image forming device, a display, a processor, and a memory to store instructions executable by the processor. By executing the instructions, the processor is to display, through the display, a setting screen including a user interface to set an operation of the wakeup source, obtain information on a condition for cancelling the power saving mode based on setting information of the wakeup source received from the setting screen, and cancel the power saving mode in a case where a cancellation condition included in the information on the condition for cancelling the power saving mode is met in the power saving mode.

15 Claims, 13 Drawing Sheets

(58) Field of Classification Search
CPC ............ H04N 1/0097; G06K 15/4055; G06K 15/406; G06F 3/0482; G06F 3/0484; G06F 3/04842; G06F 3/04847; G06F 3/1221; G06F 3/1231; G06F 1/32–3296
See application file for complete search history.

(56) References Cited

U.S. PATENT DOCUMENTS

| | | | |
|---|---|---|---|
| 9,128,648 B2* | 9/2015 | Kawaguchi | G06F 3/1221 |
| 9,442,445 B2* | 9/2016 | Hashimoto | G03G 15/5004 |
| 10,666,825 B2* | 5/2020 | Yamaguchi | H04N 1/00891 |
| 10,896,010 B1 | 1/2021 | Marunouchi | |
| 2007/0223028 A1 | 9/2007 | Boyes et al. | |
| 2008/0109663 A1 | 5/2008 | Snyder et al. | |
| 2008/0120512 A1 | 5/2008 | Wang | |
| 2008/0186524 A1 | 8/2008 | Morimoto | |
| 2011/0252252 A1* | 10/2011 | Ramakrishnan | G06F 1/3284 713/320 |
| 2012/0272081 A1 | 10/2012 | Moloney | |
| 2013/0318384 A1* | 11/2013 | Yoshihara | G06F 1/3203 713/323 |
| 2014/0108843 A1* | 4/2014 | Choho | G06F 1/3228 713/323 |
| 2014/0245432 A1 | 8/2014 | Zhou | |
| 2015/0153814 A1 | 6/2015 | Furushige et al. | |
| 2015/0153973 A1 | 6/2015 | Kawaguchi | |
| 2015/0277814 A1* | 10/2015 | Shibata | G06F 3/1229 358/1.13 |
| 2021/0240410 A1* | 8/2021 | Saegusa | G06F 3/3209 |

FOREIGN PATENT DOCUMENTS

| | | | | |
|---|---|---|---|---|
| JP | 2015104852 A | * | 6/2015 | ......... G03G 15/5004 |
| KR | 10-2005-0048807 A | | 5/2005 | |
| KR | 10-2019-0058115 A | | 5/2019 | |

* cited by examiner

FIG. 4A

| SET POWER SAVING MODE | SELECT EVENT FOR CANCELLING POWER SAVING MODE |
|---|---|
| WAKEUP SOURCE | ☐ RECEIVE REQUEST FOR IMAGE FORMING OPERATION FROM OUTSIDE<br>☑ LCD TOUCH —411<br>☑ OPEN SCANNER COVER —412<br>☐ OPEN FRONT/SIDE COVER<br>☐ RECEIVE FAX<br>☑ RECEIVE REQUEST FOR USB PRINT OPERATION —413<br>☐ CARD READER TAGGING |

FIG. 4B

| SET POWER SAVING MODE | SELECT EVENT FOR CANCELLING POWER SAVING MODE |
|---|---|
| WAKEUP SOURCE | ☐ NETWORK INTERFACE DEVICE<br>☑ USER INPUT DEVICE —421<br>☑ SCANNER —422<br>☐ PRINT DEVICE<br>☐ FAX DEVICE<br>☑ USB DEVICE —423 |

FIG. 6

|  | PRINT OPERATION | FAX OPERATION | SCAN OPERATION | COPY OPERATION |
|---|---|---|---|---|
| NUMBER OF OPERATIONS PER WEEK | 730 | 12 | 87 | 163 |
| OPERATION FREQUENCY | VERY HIGH | LOW | NORMAL | HIGH |

FIG. 10A

| TIME \ OPERATION | PRINT OPERATION (TIMES) | FAX OPERATION (TIMES) | SCAN OPERATION (TIMES) | COPY OPERATION (TIMES) |
|---|---|---|---|---|
| 00:00~07:00 | 0 | 0 | 0 | 0 |
| 07:00~08:30 | 60 | 1 | 3 | 15 |
| 08:00~10:30 | 70 | 2 | 7 | 23 |
| 10:30~12:00 | 55 | 0 | 5 | 17 |
| 12:00~13:30 | 12 | 0 | 0 | 10 |
| 13:30~15:00 | 33 | 1 | 2 | 23 |
| 15:30~17:00 | 38 | 1 | 0 | 24 |
| 17:00~18:30 | 16 | 0 | 1 | 9 |
| 18:30~20:00 | 15 | 0 | 0 | 5 |
| 20:00~24:00 | 6 | 0 | 1 | 3 |

| STANDBY TIME / TIME | LOW LEVEL STANDBY TIME (MINUTES) 1010 | MIDDLE LEVEL STANDBY TIME (MINUTES) 1020 | HIGH LEVEL STANDBY TIME (MINUTES) 1030 |
| --- | --- | --- | --- |
| 00:00~07:00 | 0 | 0 | 0 |
| 07:00~08:30 | 60 | 60 | 60 |
| 08:00~10:30 | 60 | 60 | 60 |
| 10:30~12:00 | 60 | 60 | 60 |
| 12:00~13:30 | 60 | 30 | 15 |
| 13:30~15:00 | 60 | 30 | 30 |
| 15:30~17:00 | 60 | 30 | 30 |
| 17:00~18:30 | 60 | 30 | 15 |
| 18:30~20:00 | 60 | 30 | 15 |
| 20:00~24:00 | 0 | 15 | 10 |

POWER SAVING MODE OF IMAGE FORMING APPARATUS WITH SETTING DETECTION OF WAKEUP EVENTS AND DEACTIVATION OF WAKEUP EVENT DETECTION BASED ON USAGE PATTERN

BACKGROUND

If there is no print job or data is not received during a preset time in an image forming device, the image forming device may be switched from a standby mode to a power saving mode. In a case where the image forming device enters the power saving mode, power consumed by the image forming device may be saved.

BRIEF DESCRIPTION OF THE DRAWINGS

Various examples will be described below by referring to the following figures.

FIGS. 4A and 4B are diagrams illustrating a setting screen to set an operation of a wakeup source, according to an example.

FIG. 6 is a diagram of usage pattern information of an image forming device based on a result of collecting operation history information of the image forming device, according to an example.

FIG. 10A is a diagram illustrating a result of collecting operation history information of an image forming device for each of a plurality of time sections, according to an example.

DETAILED DESCRIPTION

Figure 1:
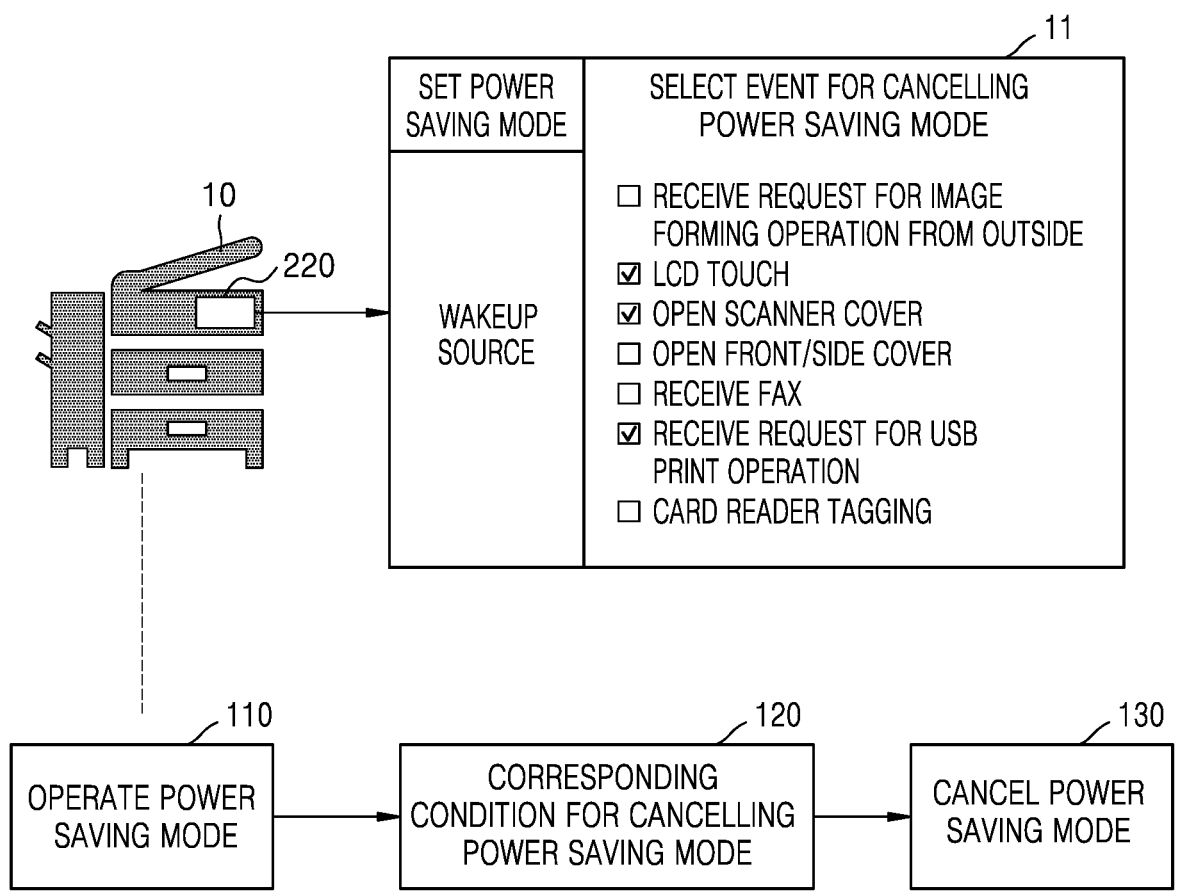
FIG. 1 is a conceptual diagram illustrating an operation of an image forming device to obtain information on a condition for cancelling a power saving mode and cancel the power saving mode according to the information on the condition for cancelling the power saving mode, according to an example.

Hereinafter, examples will be described with reference to the accompanying drawings. However, the present disclosure may be implemented in various different forms and is not limited to the examples described herein.

An "image forming device" may be any kind of device capable of performing an image forming operation, such as a printer, a copier, a scanner, a fax machine, a multi-function printer (MFP), a display device, or the like. The image forming device may be a two-dimensional (2D) image forming device or a three-dimensional (3D) image forming device. An "image forming operation performed by an image forming device" may be an operation related to printing, copying, scanning, faxing, storage, transmission, coating, etc., or a combination of two or more of the above operations.

A "power saving mode of the image forming device" may refer to a state in which the image forming device is connected to a power source, but does not perform an image forming operation, and stands by to be switched to a certain operation state or an idle state. For example, if the image forming operation is not performed by the image forming device during a standby time for entering the power saving mode, the image forming device may enter the power saving mode. In the power saving mode of the image forming device, a minimum amount of power may be consumed.

A "wakeup source" may detect an event for cancelling the power saving mode of the image forming device. For example, the event for cancelling the power saving mode may include receiving a command requesting an image forming operation from an external device, receiving a command from a button or a user interface provided by the image forming device, detecting an operation of hardware of the image forming device, and the like. The event for cancelling the power saving mode of the image forming device may be an event for starting use of the image forming device. For example, the wakeup source may identify an event for starting use of the image forming device. In addition, the wakeup source may perform an image forming operation corresponding to an event, or transmit a command or signal to a processor of the image forming device such that an image forming operation corresponding to an event is performed, based on an identified event. For example, the wakeup source may include a network interface device, a user input device, a scanner, a printing device, a fax device, a universal serial bus (USB) device, etc. For example, if an event for cancelling the power saving mode of the image forming device is detected from the wakeup source while the image forming device operates in the power saving mode, the power saving mode of the image forming device may be cancelled.

"Information on a condition for cancelling the power saving mode" may refer to information indicating a condition for cancelling the power saving mode of the image forming device. For example, in a case where the condition for cancelling the power saving mode is met in the power saving mode, the image forming device may cancel the power saving mode. In a case where the power saving mode is cancelled, each component of the image forming device may be in an activation state.

FIG. 1 is a conceptual diagram illustrating an operation of an image forming device to obtain information on a condition for cancelling a power saving mode and cancel the power saving mode according to the information on the condition for cancelling the power saving mode, according to an example.

Referring to FIG. 1, an image forming device 10 may display, through a display 220 in the image forming device 10, a setting screen including a user interface to set an operation condition of a wakeup source. The wakeup source may detect an event for cancelling the power saving mode of the image forming device 10.

Referring to an image 11 of FIG. 1, the image forming device 10 may display the user interface to set an operation of the wakeup source. The operation of the wakeup source may be an operation to detect an event for cancelling the power saving mode. The user interface may receive a selection to activate an operation of detecting an event for cancelling the power saving mode.

For example, the event for cancelling the power saving mode may include an event for receiving a request for an image forming operation from the outside, an event for receiving a touch input (i.e., a touch input on a liquid crystal display (LCD) screen), an event for opening a scanner cover, an event for opening a front/side cover, an event for receiving a fax, an event for receiving a request for a print operation via USB, an event for tagging a card to a reader, and the like.

The image forming device 10 may receive, through a setting screen, an input to select whether to activate an operation of detecting the event for cancelling the power saving mode from the wakeup source. For example, the image forming device 10 may receive an input to select the event for receiving the LCD touch input, the event for opening the scanner cover, and the event for receiving the request for the print operation through the USB. The image forming device 10 may obtain information on a condition for cancelling the power saving mode based on a selected input. For example, the image forming device 10 may control a user input device, a scanner, and a USB device to be activated in the power saving mode. By setting whether to activate the wakeup source through the user interface, power consumption may be minimized in the power saving mode of the image forming device 10.

Referring to a block 110 of FIG. 1, in a case where an image forming operation is not performed during a preset time in the image forming device 10, the image forming device 10 may operate in the power saving mode. As the image forming device 10 operates in the power saving mode, the user input device, the scanner, and the USB device may maintain an activation state.

Referring to a block 120 of FIG. 1, the image forming device 10 may detect an event corresponding to the condition for cancelling the power saving mode. As an example, in the power saving mode in the image forming device 10, the user input device may detect an event of receiving an LCD touch input, the scanner may detect an event of opening a scanner cover, and the USB device may detect an event of receiving a request for a print operation via USB.

Referring to a block 130 of FIG. 1, in a case where an event corresponding to the condition for cancelling the power saving mode is detected, the image forming device 10 may cancel the power saving mode. For example, in a case where the event of receiving the LCD touch input is detected in the power saving mode, the image forming device 10 may cancel the power saving mode.

Figure 2:
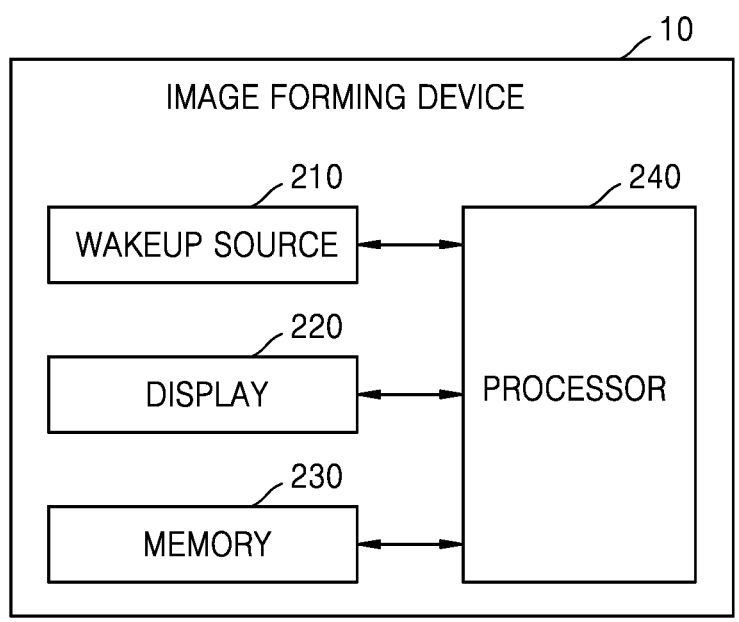
FIG. 2 is a block diagram illustrating an image forming device, according to an example.

FIG. 2 is a block diagram illustrating an image forming device, according to an example.

Referring to FIG. 2, the image forming device 10 may include a wakeup source 210, the display 220, a memory 230, and a processor 240. However, the image forming device 10 may be implemented by more components than the illustrated components, and the image forming device 10 may be implemented by fewer components than the illustrated components. Hereinafter, examples of the components will be described.

The wakeup source 210 may detect an event for cancelling a power saving mode of the image forming device 10. For example, the wakeup source may include a network interface device, a user input device, a scanner, a print device, a fax device, a USB device, etc.

The display 220 may display information corresponding to an operation of the image forming device 10, a state of the image forming device 10, or the like. In addition, the display 220 may include a touch screen to receive an input for controlling an operation of the image forming device 10 from a user.

The memory 230 may store machine readable instructions, a program, etc. For example, the memory 230 may store a program to provide a user interface to set an operation of the wakeup source 210 that detects an event for cancelling the power saving mode in the image forming device 10, to obtain information on a condition for cancelling the power saving mode based on setting information received via the user interface, and include instructions for an operation method of the image forming device 10 to cancel the power saving mode according to the cancellation condition.

The processor 240 may control an operation of the image forming device 10 and include a processor such as a central processing unit (CPU), an application specific integrated circuit (ASIC), etc. The processor 240 may include a specialized processor corresponding to each function, or may be an integrated processor.

The processor 240 may execute a program stored in the memory 230, read data or a file stored in the memory 230, or store a new file in the memory 230. The processor 240 may execute instructions stored in the memory 230.

For example, the processor 240 may display, through the display 220, a setting screen including a user interface to set an operation of the wakeup source 210. For example, the display 220 may display, on the setting screen, the user interface to set whether to activate the wakeup source 210. As an example, the display 220 may display the user interface capable of setting whether to activate an operation of detecting an event for cancelling the power saving mode from the wakeup source 210.

For example, the display 220 may display, on the setting screen, the user interface capable of setting whether to activate the wakeup source 210. For example, the display 220 may display, on the setting screen, the user interface capable of individually selecting an event detectable from the wakeup source 210.

By providing a user interface to set whether to activate the wakeup source 210, the image forming device 10 may deactivate, in the power saving mode, a wakeup source having a low frequency of use. By deactivating the wakeup source with the low frequency of use in the power saving mode, power consumed by the image forming device 10 may be saved.

The processor 240 may obtain information on a condition for cancelling the power saving mode based on setting information regarding an operation of the wakeup source 210 received through the setting screen.

The processor 240 may collect operation history information of the image forming device 10. For example, the operation history information of the image forming device 10 may include a type of an image forming operation performed by the image forming device 10, a number of image forming operations performed by the image forming device 10, a time at which an image forming operation is requested, etc. The processor 240 may obtain usage pattern information of the image forming device 10 based on a result of collecting the operation history information of the image forming device 10. For example, the processor 240 may identify an image forming operation with a high frequency of operation and an image forming operation with a low frequency of operation, based on the number of image forming operations. The processor 240 may also identify a distribution of image forming operations over time based on the time at which the image forming operations are requested and the number of image forming operations.

The processor 240 may automatically set activation or deactivation for a wakeup source based on the usage pattern information of the image forming device 10, thereby obtaining the information on the condition for cancelling the power saving mode.

For example, the processor 240 may set the image forming device 10 such that a wakeup source with a high frequency of use in the image forming device 10 is automatically activated in the power saving mode, and a wakeup source with a low frequency of use in the image forming device 10 is automatically deactivated in the power saving mode, based on the usage pattern information of the image forming device 10. For example, a high or a low frequency of use may be determined depending on whether the frequency of use exceeds a reference frequency.

For example, the processor 240 may activate an operation to detect an event for cancelling the power saving mode from a wakeup source with a high frequency of use and deactivate an operation to detect an event for cancelling the power saving mode from a wakeup source with a low frequency of use, based on the usage pattern information of the image forming device 10, thereby automatically obtaining the information on the condition for cancelling the power saving mode.

In a case where the information on the condition for cancelling the power saving mode is automatically changed based on the usage pattern information of the image forming device 10, the processor 240 may display, through the display 220, a message notifying about a change in the information on the condition for cancelling the power saving mode.

The processor 240 may recommend the information on the condition for cancelling the power saving mode for a wakeup source based on the usage pattern information of the image forming device 10.

For example, if the usage pattern information of the image forming device 10 indicates that an operation frequency of image forming operations performed based on a first wakeup source does not equal the reference frequency (i.e., is less than the reference frequency) within a predetermined period of time, the processor 240 may recommend setting deactivation of the first wakeup source.

For example, if the usage pattern information of the image forming device 10 indicates that the operation frequency of image forming operations performed based on a second wakeup source equals or exceeds the reference frequency within the predetermined period of time, the processor 240 may recommend setting activation of the second wakeup source.

The processor 240 may display, through the display 220, a message including information recommending a condition for cancelling the power saving mode for a wakeup source according to a predetermined period. The processor 240 may monitor an operation of the image forming device 10 according to the information on the condition for cancelling the power saving mode, which may be set based on an input received in response to the message.

In the power saving mode of the image forming device 10, in a case where a cancellation condition included in the information on the condition for cancelling the power saving mode is met, the processor 240 may cancel the power saving mode.

The processor 240 may set a standby time for entering the power saving mode of the image forming device 10 based on the usage pattern information of the image forming device 10. For example, the processor 240 may set, at a predetermined time interval, the standby time for entering the power saving mode for a plurality of time sections based on the operation frequency of image forming operations performed by the image forming device 10.

For example, for each of the plurality of time sections, the processor 240 may set the standby time for entering the power saving mode longer as the operation frequency of image forming operations is higher and set the standby time for entering the power saving mode shorter as the operation frequency of image forming operations is lower. As a more specific example, the standby time for entering the power saving mode for a time section in which image forming operations are frequently performed may be set to 60 minutes. On the other hand, the standby time for entering the power saving mode for a time section in which image forming operations are not performed may be set to 0 minutes. The standby time for entering the power saving mode may be predetermined by an administrator or a user.

Figure 3:
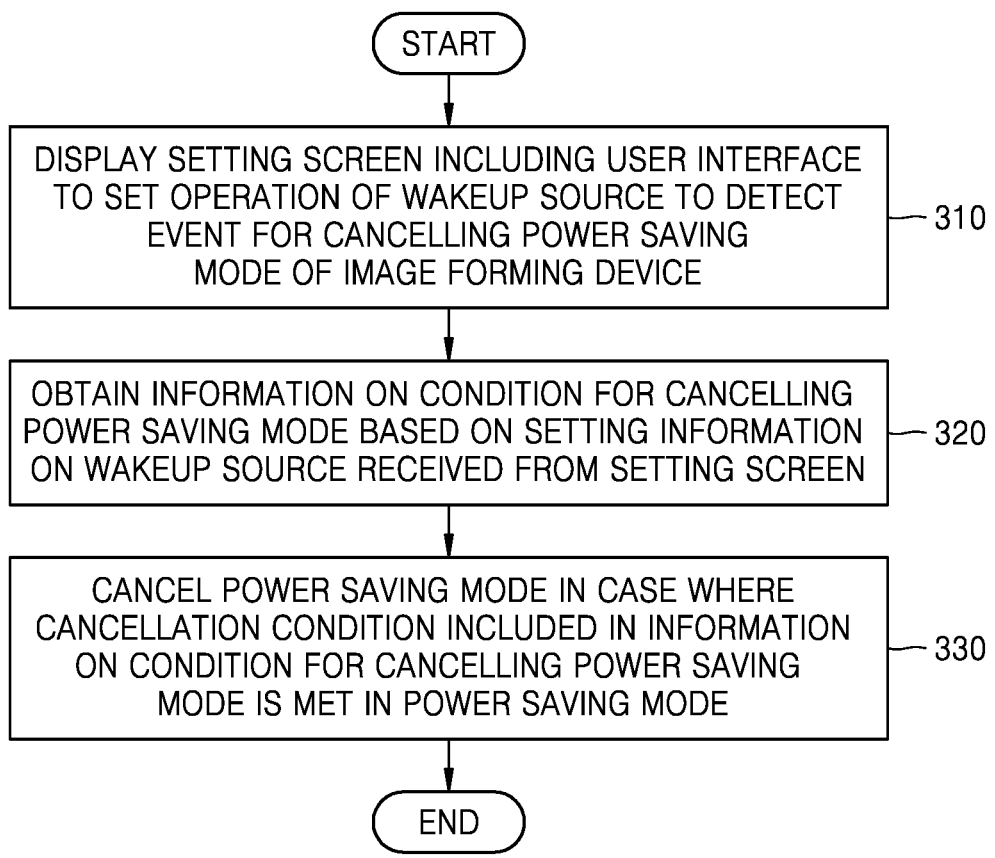
FIG. 3 is a flowchart illustrating an operation of an image forming device to obtain information on a condition for cancelling a power saving mode and to cancel the power saving mode in a case where a cancellation condition is met in the power saving mode, according to an example.

FIG. 3 is a flowchart illustrating an operation of an image forming device to obtain information on a condition for cancelling a power saving mode and to cancel the power saving mode in a case where a cancellation condition is met in the power saving mode, according to an example.

Referring to FIG. 3, the image forming device 10 may display a setting screen including a user interface to set a condition for an operation of the wakeup source to detect an event for cancelling the power saving mode of the image forming device 10 in operation 310.

For example, the image forming device 10 may display, on the setting screen, the user interface to set whether to activate the wakeup source. For example, the wakeup source may include a network interface device, a user input device, a scanner, a print device, a fax device, a USB device, etc.

In operation 320, the image forming device 10 may obtain the information on the condition for cancelling the power saving mode based on setting information on the wakeup source received from the setting screen.

In addition, the image forming device 10 may automatically set, from the setting screen, the information on the condition for cancelling the power saving mode, or receive an input to activate a function for recommending the information on the condition for cancelling the power saving mode. The image forming device 10 may obtain the information on the condition for cancelling the power saving mode based on an input to activate a function for automatically setting the information on the condition for cancelling the power saving mode or the function for recommending the information on the condition for cancelling the power saving mode.

As an example, the image forming device 10 may obtain usage pattern information of the image forming device 10 based on a result of collecting operation history information of the image forming device 10. For example, the image forming device 10 may automatically set activation or deactivation for an operation of the wakeup source based on the usage pattern information of the image forming device 10 to obtain the information on the condition for cancelling the power saving mode. For example, in a case where the information on the condition for cancelling the power saving mode is automatically changed, the image forming device 10 may display a message notifying about a change in the information on the condition for cancelling the power saving mode, based on the usage pattern information of the image forming device 10. For example, the image forming device 10 may recommend the information on the condition for cancelling the power saving mode for the wakeup source based on the usage pattern information of the image forming device 10.

In operation 330, the image forming device 10 may cancel the power saving mode in a case where a cancellation condition included in the information on the condition for cancelling the power saving mode is met in the power saving mode.

FIGS. 4A and 4B are diagrams illustrating a setting screen to set an operation of a wakeup source, according to an example.

FIG. 4A illustrates a setting screen including a user interface to set an operation of a wakeup source, according to an example. The image forming device 10 may display, through a display of the image forming device 10, the setting screen including the user interface to set the operation of the wakeup source. The image forming device 10 may receive setting information of the operation of the wakeup source from the setting screen. For example, the operation of the wakeup source may be an operation of detecting an event for cancelling a power saving mode. For example, the setting information for the operation of the wakeup source may be information for setting whether to activate the operation of the wakeup source. The image forming device 10 may obtain information on a condition for cancelling the power saving mode based on the setting information regarding the operation of the wakeup source.

For example, the setting screen may be provided with a user interface to select an event for cancelling the power saving mode detectable by the wakeup source. As an example, as shown in FIG. 4A, the setting screen may be provided with a user interface to select an event such as receive a request for an image forming operation from the outside, receive an LCD touch, detect an opening of a scanner cover, detect an opening of a front/side cover, receive a request for a fax operation, receive a request for a USB print operation, and detect a card reader tagging and individually select items. Of course, the items shown in FIG. 4A are examples, and other items may be provided on the setting screen.

In the example of FIG. 4A, the image forming device 10 may receive an input to select an "LCD touch" item 411, an "open scanner cover" item 412, and a "receive request for USB print operation" item 413 in relation to the event for cancelling the power saving mode. The image forming device 10 may set detection of an event for touching the LCD, an event for opening the cover of the scanner, and an event for receiving the request for the print operation through the USB as conditions for cancelling the power saving mode. In the power saving mode, the image forming device 10 may set a user input device to detect the event for touching the LCD, may set the scanner to detect the event for opening the cover of the scanner, and may set the USB device to detect the event for receiving the request for the print operation through the USB to be activated. That is, in the image forming device 10 operating in the power saving mode, the user input device, the scanner, and the USB device may be activated, and other devices in the image forming device 10 may be deactivated.

In the image forming device 10 operating in the power saving mode, in a case where the event for touching the LCD, the event for opening the scanner cover, or the event for receiving the request for the print operation through USB is detected, the image forming device 10 may cancel the power saving mode.

FIG. 4B illustrates a setting screen including a user interface to set an operation of a wakeup source, according to another example. The image forming device 10 may display a setting screen including a user interface capable of selecting an item of a wakeup source that detects an event for cancelling a power saving mode of the image forming device 10 and individually selecting items. In the example of FIG. 4B, the wakeup source may be a network interface device, a user input device, a scanner, a print device, a fax device, or a USB device. Of course, the wakeup sources shown in FIG. 4B are examples, and other items may be provided on the setting screen.

For example, as shown in FIG. 4B, the image forming device 10 may receive an input to select a "user input device" item 421, a "scanner" item 422, and a "USB device" item 423. The image forming device 10 may set detection of an event from the user input device, the scanner, or the USB device as the condition for cancelling the power saving mode. In the power saving mode, the image forming device 10 may set the user input device, the scanner, and the USB device to be activated, and set other devices in the image forming device 10 to be deactivated.

In an example of the image forming device 10 operating in the power saving mode, since the user input device, the scanner, and the USB device are activated, the user input device, the scanner, and the USB device may respectively detect an event occurring in the user input device, the scanner, and the USB device. In the image forming device 10 operating in the power saving mode, in a case where an event for receiving a certain input from the user input device, an event for opening the cover of the scanner from the scanner, or an event for receiving the request for the print operation from the USB device is detected, the image forming device 10 may cancel the power saving mode.

Figure 5:
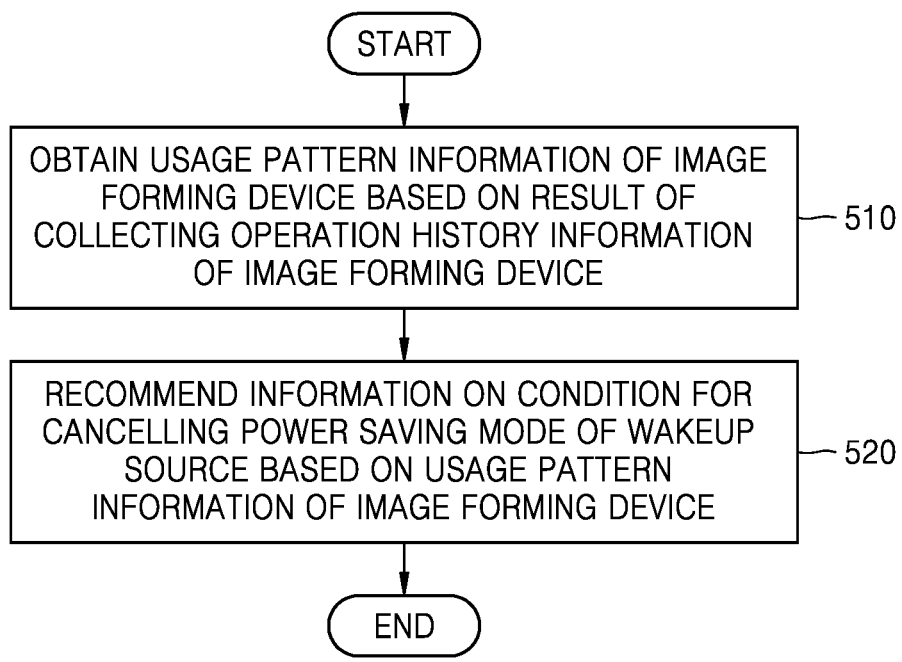
FIG. 5 is a flowchart illustrating an operation of an image forming device to recommend information on a condition for cancelling a power saving mode, according to an example.

FIG. 5 is a flowchart illustrating an operation of an image forming device to recommend information on a condition for cancelling a power saving mode, according to an example.

Referring to FIG. 5, the image forming device 10 may obtain usage pattern information of the image forming device 10 based on a result of collecting operation history information of the image forming device 10 in operation 510.

In operation 520, the image forming device 10 may recommend information on a condition for cancelling the power saving mode for a selected wakeup source based on the usage pattern information of the image forming device 10.

For example, in a case where the usage pattern information of the image forming device 10 indicates that an operation frequency of image forming operations performed based on a first wakeup source does not equal a reference frequency (i.e., is less than a reference frequency) within a predetermined period of time, the image forming device 10 may perform an operation of recommending deactivation setting of the first wakeup source.

For another example, in a case where the usage pattern information of the image forming device 10 indicates that the operation frequency of the image forming operation performed based on a second wakeup source equals or exceeds the reference frequency within the predetermined period of time, the image forming device 10 may perform an operation of recommending activation setting of the second wakeup source.

For example, the image forming device 10 may display a message recommending the information on the condition for cancelling the power saving mode for a wakeup source according to a predetermined period. The image forming device 10 may monitor an operation of the image forming device 10 according to the information on the condition for cancelling the power saving mode, which may be set based on an input received in response to the message.

FIG. 6 is a diagram of usage pattern information of an image forming device based on a result of collecting operation history information of the image forming device, according to an example.

Referring to FIG. 6, the image forming device 10 may collect operation history information of the image forming device 10. For example, the operation history information of the image forming device 10 may be history information regarding image forming operations performed by the image forming device 10 for a predetermined period of time. For example, the operation history information of the image forming device 10 may include information on a type of image forming operation performed by the image forming device 10, information on an operation frequency of an image forming operation, information on a time at which an image forming operation is requested, etc.

In the example of FIG. 6, the image forming device 10 may count the number of print operations, fax operations, scan operations, and copy operations performed by the image forming device 10 during one week. For example, during one week, the number of print operations may be 730, the number of fax operations may be 12, the number of scan operations may be 87, and the number of copy operations may be 163.

The image forming device 10 may obtain the usage pattern information of the image forming device 10 based on the result of collecting the operation history information of the image forming device 10. For example, the usage pattern information of the image forming device 10 may refer to information indicating a usage pattern of the image forming device 10 analyzed from the operation history information of the image forming device 10. For example, the usage pattern information of the image forming device 10 may include information such as a frequency of use of functions used in the image forming device 10 and an operation frequency of image forming operations performed by the image forming device 10.

For example, criteria for an intensity of the operation frequency of image forming operations may be predetermined. For example, in terms of the criteria for the intensity of the operation frequency, in a case where, during one week, the number of image forming operations is 200 or more, the operation frequency may be set as very high, in a case where, during one week, the number of image forming operations is 150 or more and fewer than 200 times, the operation frequency may be set as high, in a case where, during one week, the number of image forming operations is 50 or more and fewer than 150 times, the operation frequency may be set as normal, and in a case where, during one week, the number of image forming operations is fewer than 50, the operation frequency may be set as low.

Referring to FIG. 6, the image forming device 10 may set an operation frequency for each image forming operation based on a result of counting the number of print operations, fax operations, scan operations, and copy operations performed by the image forming device 10 during one week. For example, the image forming device 10 may set the operation frequency of the print operations to be very high, the operation frequency of the fax operations to be low, the operation frequency of the scan operations to be normal, and the operation frequency of the copy operations to be high.

Figure 7:
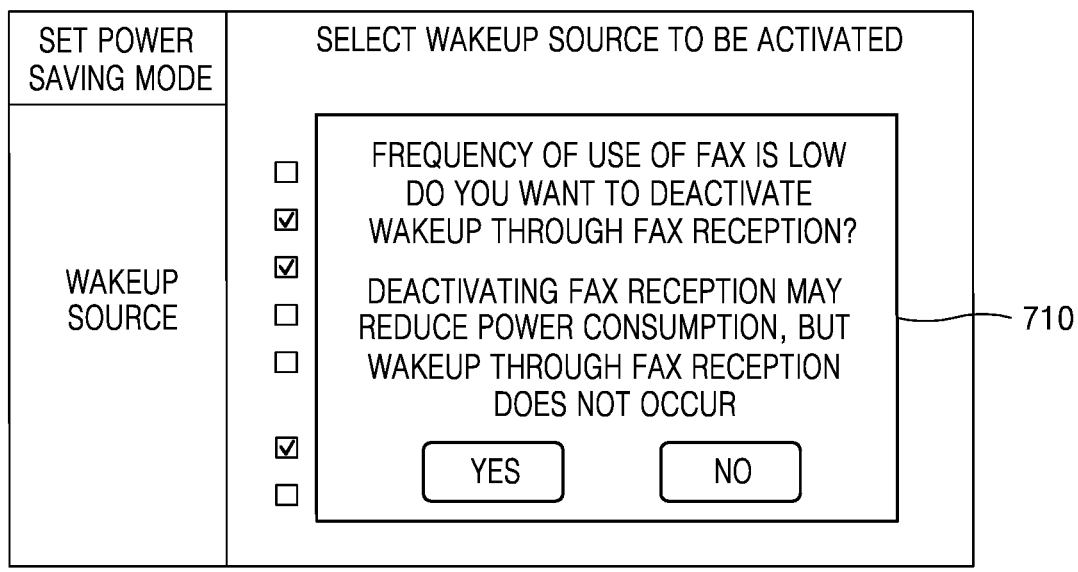
FIG. 7 is a diagram illustrating a setting screen to recommend information on a condition for cancelling a power saving mode of a wakeup source based on usage pattern information of an image forming device, according to an example.

FIG. 7 is a diagram illustrating a setting screen to recommend information on a condition for cancelling a power saving mode for a wakeup source based on usage pattern information of an image forming device, according to an example.

Referring to FIG. 7, the image forming device 10 may recommend the information on the condition for cancelling the power saving mode for a wakeup source based on the usage pattern information of the image forming device 10. For example, the image forming device 10 may display recommendation information for cancelling the power saving mode. For example, the recommendation information may include information on a wakeup source to be activated or a wakeup source to be deactivated. The recommendation information may also include information on whether to activate an operation of detecting a certain event from the wakeup source. The recommendation information may also include information on advantages or disadvantages according to activation or deactivation of the wakeup source.

For example, in a case where the usage pattern information of the image forming device 10 indicates that an operation frequency of image forming operations performed based on a first wakeup source does not equal a reference frequency (i.e., is less than a reference frequency) within a predetermined period of time, the image forming device 10 may recommend setting deactivation of the first wakeup source.

As another example, in a case where the usage pattern information of the image forming device 10 indicates that the operation frequency of image forming operations performed based on a second wakeup source equals or exceeds the reference frequency within the predetermined period of time, the image forming device 10 may recommend setting activation of the second wakeup source.

As described with reference to FIG. 6, it may be determined that an operation frequency of a fax operation is low. In that case, the image forming device 10 may recommend that a fax device be deactivated in the power saving mode in order not to cause power consumption of the fax device in the power saving mode based on the low frequency of the fax operation.

That is, the image forming device 10 may display recommendation information 710 for recommending that a "fax reception" item be deactivated. The recommendation information 710 may include information on grounds for recommending that the "fax reception" item be deactivated, and information on advantages or disadvantages of deactivating the "fax reception" item.

Figure 8:
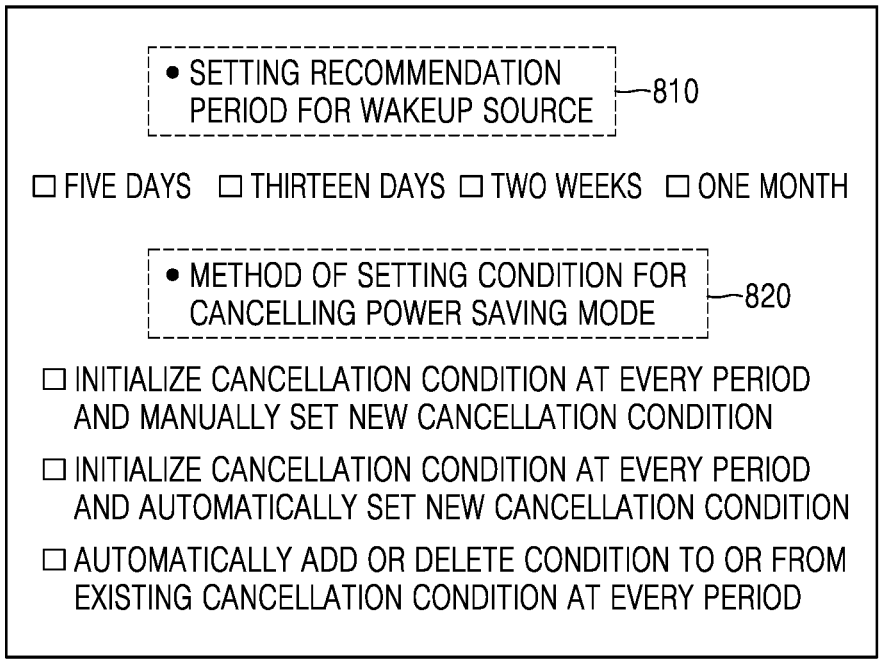
FIG. 8 is a diagram illustrating a setting screen to set information on a condition for cancelling a power saving mode, according to an example.

FIG. 8 is a diagram illustrating a setting screen to set information on a condition for cancelling a power saving mode, according to an example.

Referring to FIG. 8, the image forming device 10 may display a setting screen to set a period for recommending the information on the condition for cancelling the power saving mode. For example, the image forming device 10 may display a "setting recommendation period for wakeup source" item 810. For example, the setting recommendation period may be set to 5 days, 13 days, 2 weeks, 1 month, and the like. In addition, the image forming device 10 may display a user interface capable of selecting the setting recommendation period. Moreover, the image forming device 10 may provide an input box for manually inputting the setting recommendation period.

For example, the image forming device 10 may display a setting screen to set a method of changing the setting of a cancellation condition of the power saving mode. For example, the image forming device 10 may display a "method of setting condition for cancelling power saving mode" item 820. The image forming device 10 may display, in the item 820, the user interface capable of selecting a method of periodically changing the setting of the condition for cancelling the power saving mode.

As an example, as shown in FIG. 8, the user interface may include a first setting method of, for each period, initializing the cancellation condition and manually setting a new cancellation condition, a second setting method of, for each period, initializing the cancellation condition and automatically setting the new cancellation condition, and a third setting method of, for each period, automatically adding or deleting a condition to or from an existing cancellation condition.

For example, in a case where an input for selecting the first setting method of, at each period, initializing the cancellation condition and manually setting the new cancellation condition is received, the image forming device 10 may display, at every predetermined period, a message requesting for initializing the information on the condition for cancellation of the power saving mode and for setting the information on the condition for cancellation of the power saving mode. In that case, the image forming device 10 may display a message recommending the information on the condition for cancelling the power saving mode for a wakeup source based on the usage pattern information of the image forming device 10. A user may identify the message recommending the information on the condition for cancelling the power saving mode, and may set the information on the condition for cancelling the power saving mode.

As another example, in a case where an input for selecting the second setting method of initializing the cancellation condition and automatically setting the new cancellation condition is received at each period, the image forming device 10 may initialize the information on the condition for cancelling the power saving mode at each predetermined period. After the information on the condition for cancelling the power saving mode is initialized, the image forming device 10 may collect, for a predetermined period of time, operation history information of the image forming device 10 and obtain usage pattern information of the image forming device 10 from the collected operation history information.

The image forming device 10 may automatically set the information on the condition for cancelling the power saving mode for a wakeup source based on the usage pattern information of the image forming device 10. Before automatically setting the information on the condition for cancelling the power saving mode, the image forming device 10 may display a message approving a change in the information on the condition for cancelling the power saving mode. The image forming device 10 may display a message notifying about a change in the information on the condition for cancelling the power saving mode after automatically setting the information on the condition for cancelling the power saving mode.

For another example, in a case where an input for selecting the third setting method capable of automatically adding or deleting a condition to or from the existing cancellation condition is received at each period, the image forming device 10 may, at every predetermined period of time, automatically add or delete a condition to or from the existing cancellation condition of the power saving mode. For example, the image forming device 10 may delete a condition corresponding to an event having a low detection frequency among events for cancelling the power saving mode. The image forming device 10 may also add a condition previously set as a condition for cancelling the power saving mode. In a case where it is determined that the detection frequency of an event corresponding to the added cancellation condition is low after the information on the condition for cancelling the power saving mode is changed, the image forming device 10 may delete the added cancellation condition.

Figure 9:
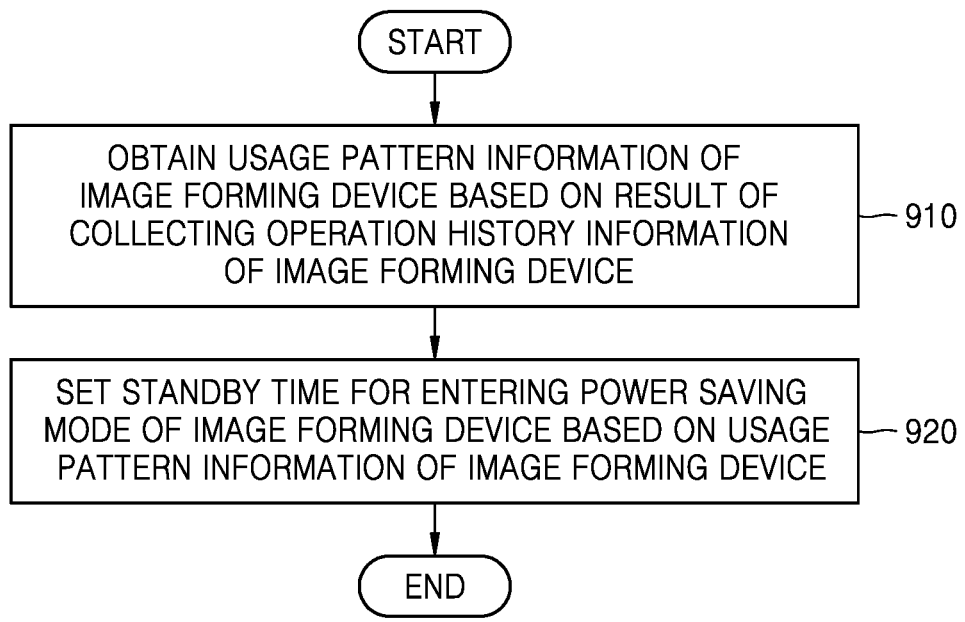
FIG. 9 is a flowchart illustrating an operation of an image forming device to set a standby time for entering a power saving mode based on usage pattern information of the image forming device, according to an example.

FIG. 9 is a flowchart illustrating an operation of an image forming device to set a standby time for entering a power saving mode based on usage pattern information of the image forming device, according to an example.

Referring to FIG. 9, the image forming device 10 may obtain usage pattern information of the image forming device 10 based on a result of collecting operation history information of the image forming device 10 in operation 910.

In operation 920, the image forming device 10 may set the standby time for entering the power saving mode of the image forming device 10 based on the usage pattern information of the image forming device 10.

FIG. 10A is a diagram illustrating a result of collecting operation history information of an image forming device for each of a plurality of time sections, according to an example.

Referring to FIG. 10A, the image forming device 10 may collect operation history information of the image forming device 10 for a plurality of time sections at preset time intervals. For example, the operation history information of the image forming device 10 may include information on a type of image forming operation performed by the image forming device 10, information on a number of image forming operations, and information on a time at which an image forming operation is requested.

In the example of FIG. 10A, the image forming device 10 may count a number of print operations, fax operations, scan operations, and copy operations performed by the image forming device 10 during one day. The image forming device 10 may count the number of each image forming operation in units of 1 hour and 30 minutes between 7:00 and 20:00. The image forming device 10 may count the number of each image forming operation in the sections from 20:00 to 24:00 and from 0:00 to 7:00.

The image forming device 10 may obtain usage pattern information of the image forming device 10 based on a result of collecting the operation history information of the image forming device 10. For example, the image forming device 10 may identify an image forming operation with a high frequency of operation and an image forming operation with a low frequency of operation based on the number of image forming operations. The image forming device 10 may also identify a distribution of image forming operations over time based on a time at which an image forming operation is requested and the number of image forming operations.

Referring to FIG. 10A, the image forming device 10 may identify an amount of image forming operations in the order of print operations, copy operations, scan operations, and fax operations, based on the number of each of a plurality of image forming operations. The image forming device 10 may also identify a distribution for each image forming operation over time based on the number of each of the plurality of image forming operations and a time at which image forming operation are requested.

Figure 10B:
FIG. 10B is a diagram illustrating a process of setting a standby time for entering a power saving mode for a plurality of time sections based on an operation frequency of image forming operations performed by the image forming device, according to an example.

FIG. 10B is a diagram illustrating a process of setting a standby time for entering a power saving mode for a plurality of time sections based on an operation frequency of image forming operations performed by an image forming device, according to an example.

Referring to FIG. 10B, the image forming device 10 may set the standby time for entering the power saving mode of the image forming device 10 based on usage pattern information of the image forming device 10. As an example, the image forming device 10 may set the standby time for entering the power saving mode for a plurality of time sections based on an operation frequency of image forming operations performed by the image forming device 10 at a predetermined time interval.

For example, for each of the plurality of time sections, the image forming device 10 may set the standby time for entering the power saving mode longer as the operation frequency of image forming operations is higher and set the standby time for entering the power saving mode shorter as the operation frequency of image forming operations is lower. For example, the image forming device 10 may preset an entry standby time for each range of the number of image forming operations. The image forming device 10 may set a standby time for entering the power saving mode corresponding to a range to which the number of image forming operations belongs at the predetermined time interval.

The image forming device 10 may also set a standby time for entering the power saving mode according to a level of the power saving mode. For example, the level of the power saving mode may be divided into a low level, a middle level, and a high level according to a degree to which the standby time for entering the power saving mode is subdivided. For example, the standby time for entering the power saving mode may be subdivided in each level of the power saving mode based on the number of image forming operations. That is, as the level of the power saving mode becomes low, middle, and high, a sensitivity of standby time for entering the power saving mode determined according to the number of image forming operations may increase.

For example, in a case where the number of image forming operations is 22 during a certain period of time, the entry standby time for the low level of the power saving mode may be set to 60 minutes, the entry standby time for the middle level of the power saving mode may be set to 30 minutes, and the entry standby time for the high level of the power saving mode may be set to 15 minutes. Therefore, in a case where the power saving mode of the image forming device is set to the high level, energy consumed by the image forming device may be efficiently saved compared to a case where the power saving mode is set to the low level.

For example, in terms of a reference for the entry standby time of the power saving mode of the low level, the image forming device 10 may set the entry standby time to 60 minutes in a case where the number of image forming operations is 20 times or more, and the image forming device 10 may set the entry standby time to 0 minutes in a case where the number of image forming operations is fewer than 20 times.

Referring to FIG. 10B, in a case where the power saving mode of the image forming device 10 is set to the low level 1010, the image forming device 10 may set the entry standby time from 0:00 to 7:00 to 0 minutes, the entry standby time from 7:00 to 20:00 to 60 minutes, and the entry standby time from 20:00 to 24:00 to 0 minutes.

For example, in terms of a reference for the entry standby time of the power saving mode of the middle level, in a case where the number of image forming operations is 70 or more, the image forming device 10 may set the entry standby time to 60 minutes, in a case where the number of image forming operations is 20 or more and fewer than 70, the image forming device 10 may set the entry standby time to 30 minutes, in a case where the number of image forming operations is 1 or more and fewer than 20, the image forming device 10 may set the entry standby time to 15 minutes, and in a case where the number of image forming operations is 0, the image forming device 10 may set the entry standby time to 0 minutes.

Referring to FIG. 10B, in a case where the power saving mode of the image forming device 10 is set to the middle level 1020, the image forming device 10 may set the entry standby time from 0:00 to 7:00 to 0 minutes, the entry standby time from 7:00 to 12:00 to 60 minutes, the entry standby time from 12:00 to 20:00 to 30 minutes, and the entry standby time from 20:00 to 24:00 to 15 minutes.

For example, in terms of a reference for the entry standby time of the power saving mode of the high level, in a case where the number of image forming operations is 70 or more, the image forming device 10 may set the entry standby time to 60 minutes, in a case where the number of image forming operations is 50 or more and fewer than 70, the image forming device 10 may set the entry standby time to 30 minutes, in a case where the number of image forming operations is 20 or more and fewer than 50, the image forming device 10 may set the entry standby time to 15 minutes, in a case where the number of image forming operations is 1 or more and fewer than 20, the image forming device 10 may set the entry standby time to 10 minutes, and in a case where the number of image forming operations is 0, the image forming device 10 may set the entry standby time to 0 minutes.

Referring to FIG. 10B, in a case where the power saving mode of the image forming device 10 is set to the high level 1030, the image forming device 10 may set the entry standby time from 0:00 to 7:00 to 0 minutes, the entry standby time from 7:00 to 12:00 to 60 minutes, the entry standby time from 12:00 to 13:30 to 15 minutes, the entry standby time from 13:30 to 17:00 to 30 minutes, the entry standby time from 17:00 to 20:00 to 15 minutes, and the entry standby time from 20:00 to 24:00 to 10 minutes.

Figure 11:
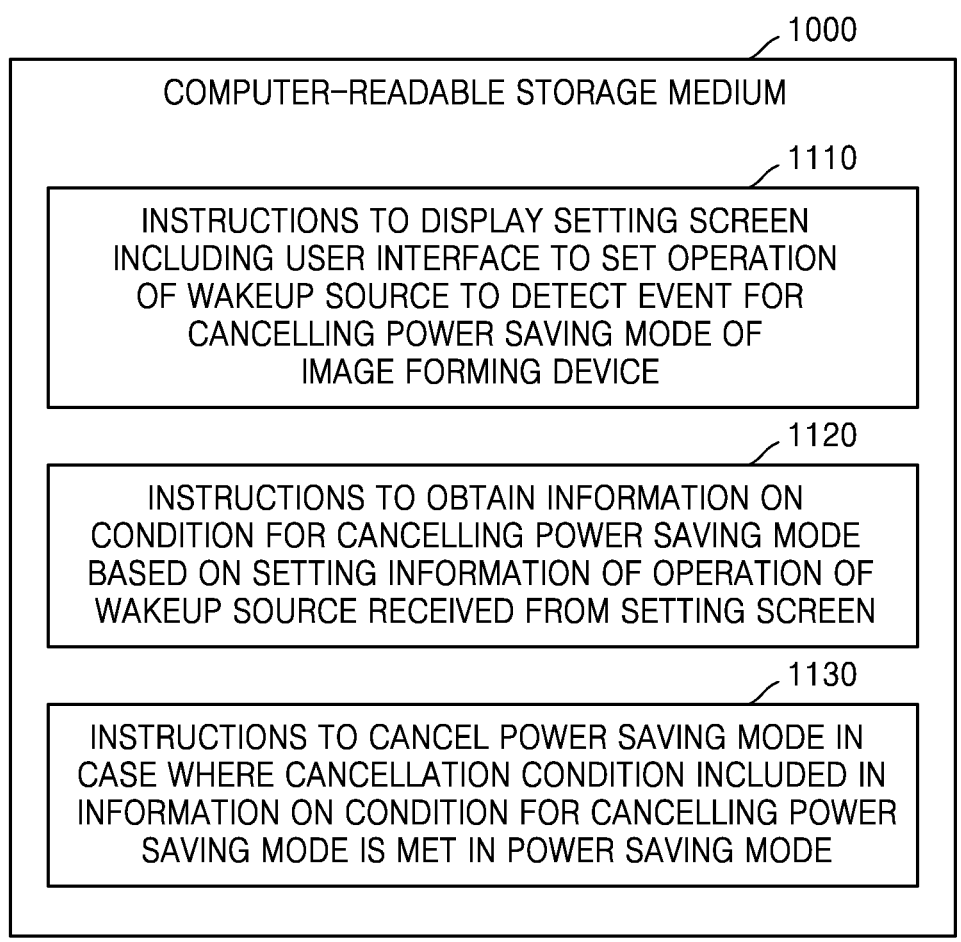
FIG. 11 is a diagram illustrating instructions stored in a computer-readable storage medium, according to an example.

FIG. 11 is a diagram illustrating instructions stored in a computer-readable storage medium, according to an example.

Referring to FIG. 11, a computer-readable storage medium 1000 may store instructions to provide a user interface to set an operation of a wakeup source that detects an event for cancelling a power saving mode in an image forming device and obtain a condition for cancelling the power saving mode based on setting information received through the user interface, and instructions for an operation method of the image forming device that cancels the power saving mode according to a cancellation condition. For example, the computer-readable storage medium 1000 may include instructions 1110 to display a setting screen including the user interface to set the operation of the wakeup source to detect an event for cancelling the power saving mode of the image forming device, instructions 1120 to obtain information on the condition for cancelling the power saving mode based on the setting information of the wakeup source received from the setting screen, and instructions 1130 to cancel the power saving mode in a case where the cancellation condition included in the information on the condition for cancelling the power saving mode information is met on the power saving mode.

The above-described operation method of the image forming device 10 may be implemented in the form of a non-transitory computer-readable storage medium for storing instructions or data executable by a computer or processor. The above-described example operation method of an image forming device may be written as a program executable on a computer, and may be implemented in a general-purpose digital computer that operates such a program using the non-transitory computer-readable storage medium. Such a non-transitory computer-readable storage medium may include read-only memory (ROM), random-access memory (RAM), flash memory, CD-ROMs, CD-Rs, CD+Rs. CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, magnetic tapes, floppy disks, magneto-optical data storage devices, optical data storage devices, hard disks, solid-state disks (SSDs), and any devices capable of storing machine readable instructions, related data, data files, and data structures, and providing a processor or a computer with machine readable instructions, related data, data files, and data structures such that the processor or the computer executes the instructions.

Although examples have been described with reference to the drawings, various modifications and variations are possible from the above descriptions. For example, even if the described techniques are performed in an order different from the described method, and/or the described components such as the system, structure, device, circuit, etc. are combined in a form different from the described method, or replaced or substituted by other components or equivalents, an appropriate result may be achieved It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming device comprising:
a wakeup source to detect a plurality of events for cancelling a power saving mode of the image forming device;
a display;
a processor; and
a memory to store instructions executable by the processor,
wherein the processor, by executing the instructions, is to:
display, through the display, a setting screen including a user interface to set an operation for detecting the plurality of events by the wakeup source, wherein the operation for detecting the plurality of events defines which of the plurality of events are activated for detection and which of the plurality of events are deactivated from detection;
obtain information on a condition for cancelling the power saving mode based on the operation of the wakeup source received from the setting screen, wherein the condition includes usage pattern information of the image forming device;
automatically deactivate the operation for detecting a portion of the plurality of events in response to the usage pattern; and
cancel the power saving mode in a case where a cancellation condition included in the information on the condition for cancelling the power saving mode is met in the power saving mode, wherein the cancellation condition includes an active operation for detecting an event from the plurality of events.

2. The image forming device of claim 1, wherein the processor, by executing the instructions, is to display, on the setting screen, the user interface to set whether to activate the wakeup source.

3. The image forming device of claim 1, wherein the wakeup source comprises a network interface device, a user input device, a scanner, a print device, a fax device, or a universal serial bus (USB) device.

4. The image forming device of claim 1, wherein the processor, by executing the instructions, is to obtain the information on the condition for cancelling the power saving mode by automatically setting activation or deactivation of the operation of the wakeup source based on the usage pattern information of the image forming device.

5. The image forming device of claim 4, wherein the processor, by executing the instructions, is to:
obtain the usage pattern information of the image forming device based on a result of collecting operation history information of the image forming device, and
recommend information on the condition for cancelling the power saving mode of the wakeup source based on the usage pattern information of the image forming device.

6. The image forming device of claim 5, wherein the processor, by executing the instructions, is to:
perform the operation to recommend deactivation of a first wakeup source in a case where the usage pattern information of the image forming device indicates that an operation frequency of image forming operations performed based on the first wakeup source is less than a reference frequency within a predetermined period of time, or
perform the operation to recommend activation of a second wakeup source in a case where the usage pattern information of the image forming device indicates that an operation frequency of image forming operations performed based on the second wakeup source is greater than or equal to the reference frequency within the predetermined period of time.

7. The image forming device of claim 5, wherein the processor, by executing the instructions, is to:
display, through the display, a message recommending the information on the condition for cancelling the power saving mode of the wakeup source according to a preset period, and
monitor the operation of the image forming device according to the information on the condition for cancelling the power saving mode set based on an input received from the message.

8. The image forming device of claim 1, wherein the processor, by executing the instructions, is to display, through the display, a message notifying about a change in the information on the condition for cancelling the power saving mode based on the usage pattern information of the image forming device in a case where the information on the condition for cancelling the power saving mode automatically changes.

9. The image forming device of claim 1, wherein the processor, by executing the instructions, is to set a standby time for entering the power saving mode of the image forming device based on the usage pattern information of the image forming device.

10. The image forming device of claim 9, wherein the processor, by executing the instructions, is to set, at a preset time interval, a standby time for entering the power saving mode of a plurality of time sections based on an operation frequency of image forming operations performed by the image forming device.

11. A method of operating an image forming device, the method comprising:
  displaying a setting screen including a user interface to set an operation for detecting a plurality of events by a wakeup source to detect activated events from the plurality of events for cancelling a power saving mode of the image forming device, wherein the operation for detecting the plurality of events defines which of the plurality of events are activated for detection and which of the plurality of events are deactivated from detection;
  obtaining information on a condition for cancelling the power saving mode based on setting information for the operation of the wakeup source received from the setting screen, wherein the condition includes usage pattern information of the image forming device;
  automatically deactivating the operation for detecting a portion of the plurality of events in response to the usage pattern information; and
  cancelling the power saving mode in a case where a cancellation condition included in the information on the condition for cancelling the power saving mode is met in the power saving mode, wherein the cancellation condition includes an active operation for detecting an event from the plurality of events.

12. The method of claim 11, wherein the displaying of the setting screen comprises displaying, on the setting screen, the user interface to set whether to activate the wakeup source.

13. The method of claim 11, further comprising:
  obtaining the information on the condition for cancelling the power saving mode based on the usage pattern information of the image forming device by automatically setting activation or deactivation of the operation of the wakeup source; or
  recommending information on the condition for cancelling the power saving mode of the wakeup source based on the usage pattern information of the image forming device.

14. The method of claim 11, further comprising setting a standby time for entering the power saving mode of the image forming device based on the usage pattern information of the image forming device.

15. A computer-readable storage medium storing instructions executable by a processor, the computer-readable storage medium comprising:
  instructions to display a setting screen including a user interface to set an operation for detecting a plurality of events by a wakeup source to detect an activated event from the plurality of events for cancelling a power saving mode of an image forming device, wherein the operation for detecting the plurality of events defines which of the plurality of events are activated for detection and which of the plurality of events are deactivated from detection;
  instructions to obtain information on a condition for cancelling the power saving mode based on setting information for the operation of the wakeup source received from the setting screen, wherein the condition includes usage pattern information of the image forming device;
  instructions to automatically deactivate the operation for detecting a portion of the plurality of events in response to the usage pattern information; and
  instructions to cancel the power saving mode in a case where a cancellation condition included in the information on the condition for cancelling the power saving mode is met in the power saving mode, wherein the cancellation condition includes an active operation for detecting an event from the plurality of events.

* * * * *